(12) United States Patent
Cobb et al.

(10) Patent No.: US 9,009,680 B2
(45) Date of Patent: Apr. 14, 2015

(54) SELECTING INSTRUMENTATION POINTS FOR AN APPLICATION

(75) Inventors: Jeffrey R. Cobb, Belmont, CA (US); Daryl L. Puryear, San Mateo, CA (US); Ling Thio, Sunnyvale, CA (US)

(73) Assignee: CA, Inc., New York, NY (US)

( * ) Notice: Subject to any disclaimer, the term of this patent is extended or adjusted under 35 U.S.C. 154(b) by 2278 days.

(21) Appl. No.: 11/612,058

(22) Filed: Dec. 18, 2006

(65) Prior Publication Data

US 2008/0148039 A1      Jun. 19, 2008

(51) Int. Cl.
*G06F 9/44*      (2006.01)
*G06F 11/36*      (2006.01)

(52) U.S. Cl.
CPC ........ *G06F 11/3624* (2013.01); *G06F 11/3612* (2013.01)

(58) Field of Classification Search
None
See application file for complete search history.

(56) References Cited

U.S. PATENT DOCUMENTS

| | | |
|---|---|---|
| 4,774,681 A | 9/1988 | Frisch |
| 5,375,199 A | 12/1994 | Harrow |
| 5,426,730 A | 6/1995 | Miyake |
| 5,655,081 A | 8/1997 | Bonnell |
| 5,784,553 A | 7/1998 | Kolawa |
| 5,790,858 A | 8/1998 | Vogel |
| 5,862,381 A | 1/1999 | Advani |
| 5,898,873 A | 4/1999 | Lehr |
| 5,940,618 A | 8/1999 | Blandy |
| 5,978,594 A | 11/1999 | Bonnell |
| 5,996,092 A | 11/1999 | Augsburg |
| 6,141,699 A | 10/2000 | Luzzi |
| 6,260,187 B1 | 7/2001 | Cirne |
| 6,263,298 B1 | 7/2001 | Kerman |
| 6,266,805 B1 | 7/2001 | Nwana |
| 6,282,701 B1 | 8/2001 | Wygodny |
| 6,295,642 B1 | 9/2001 | Blandy |
| 6,332,212 B1 | 12/2001 | Organ |
| 6,332,213 B1 | 12/2001 | Grossman |
| 6,530,075 B1 | 3/2003 | Beadle |
| 6,564,342 B2 | 5/2003 | Landan |

(Continued)

FOREIGN PATENT DOCUMENTS

EP      1024430      2/2000

OTHER PUBLICATIONS

Office Action dated Aug. 28, 2009 in U.S. Appl. No. 11/565,490.

(Continued)

*Primary Examiner* — Li B Zhen
*Assistant Examiner* — Evral Bodden
(74) *Attorney, Agent, or Firm* — Vierra Magen Marcus LLP

(57) ABSTRACT

Instrumentation points are selected for an application by running the application with comprehensive instrumentation of its components in a development mode. The application can be run by a human operator and/or load simulator which provides requests to the application. The instrumented components are monitored as the application runs. A subset of the components is selected based on criteria such as an order in which the instrumented components are invoked, whether resource utilization, such as consumption of processor cycles, exceeds a threshold, or a frequency with which components are called or call other components, and only that subset is instrumented in a production mode of the application. In one approach, the subset includes components which are invoked when traffic to/from the application matches a pattern provided by an interaction model. As a result, relevant instrumentation points can be identified.

31 Claims, 9 Drawing Sheets

(56) References Cited

U.S. PATENT DOCUMENTS

| | | |
|---|---|---|
| 6,584,501 B1 | 6/2003 | Cartsonis et al. |
| 6,611,276 B1 | 8/2003 | Muratori |
| 6,643,842 B2 | 11/2003 | Angel |
| 6,654,741 B1 | 11/2003 | Cohen |
| 6,658,367 B2 | 12/2003 | Conrad |
| 6,792,460 B2 | 9/2004 | Oulu |
| 6,941,367 B2 | 9/2005 | Vosseler |
| 7,076,695 B2 | 7/2006 | McGee |
| 7,093,013 B1 | 8/2006 | Hornok, Jr. |
| 7,284,153 B2 * | 10/2007 | Okbay et al. ................ 714/30 |
| 7,376,534 B2 * | 5/2008 | Shrivastava et al. .......... 702/182 |
| 7,478,151 B1 | 1/2009 | Maiocco et al. |
| 7,661,094 B2 * | 2/2010 | Blevin et al. ................ 717/130 |
| 7,703,094 B2 * | 4/2010 | Mongkolsmai et al. ...... 718/100 |
| 7,747,986 B2 * | 6/2010 | LaVigne et al. .............. 717/128 |
| 7,770,161 B2 * | 8/2010 | Mitran et al. ................. 717/151 |
| 7,774,741 B2 * | 8/2010 | Sridharan et al. ............ 717/100 |
| 2002/0029265 A1 | 3/2002 | Mizoguchi |
| 2002/0038228 A1 | 3/2002 | Waldorf |
| 2002/0073195 A1 | 6/2002 | Hellerstein |
| 2002/0099731 A1 | 7/2002 | Abajian |
| 2002/0169870 A1 | 11/2002 | Vosseler |
| 2002/0174222 A1 | 11/2002 | Cox |
| 2002/0198984 A1 | 12/2002 | Goldstein et al. |
| 2002/0198985 A1 | 12/2002 | Fraenkel |
| 2003/0009507 A1 | 1/2003 | Shum |
| 2003/0018909 A1 | 1/2003 | Cuomo |
| 2003/0065986 A1 | 4/2003 | Fraenkel |
| 2003/0079160 A1 | 4/2003 | McGee |
| 2003/0158895 A1 | 8/2003 | Mehra |
| 2003/0191989 A1 | 10/2003 | O'Sullivan |
| 2004/0003375 A1 | 1/2004 | George |
| 2004/0068560 A1 | 4/2004 | Oulu |
| 2004/0075690 A1 | 4/2004 | Cirne |
| 2004/0078691 A1 | 4/2004 | Cirne |
| 2004/0122942 A1 | 6/2004 | Green et al. |
| 2004/0123279 A1 | 6/2004 | Boykin |
| 2004/0172466 A1 | 9/2004 | Douglas et al. |
| 2004/0215762 A1 | 10/2004 | Oulu |
| 2004/0215768 A1 | 10/2004 | Oulu |
| 2004/0254920 A1 | 12/2004 | Brill |
| 2005/0021748 A1 | 1/2005 | Garcea |
| 2005/0039187 A1 * | 2/2005 | Avakian et al. ............... 719/310 |
| 2005/0055437 A1 | 3/2005 | Burckart |
| 2005/0114508 A1 | 5/2005 | DeStefano |
| 2005/0182750 A1 * | 8/2005 | Krishna et al. ................ 707/1 |
| 2005/0188221 A1 | 8/2005 | Motsinger et al. |
| 2005/0216585 A1 | 9/2005 | Todorova et al. |
| 2005/0228890 A1 | 10/2005 | Lawrence |
| 2005/0229165 A1 | 10/2005 | Ma |
| 2005/0235057 A1 * | 10/2005 | Brodie et al. ................ 709/224 |
| 2005/0261875 A1 * | 11/2005 | Shrivastava et al. .......... 702/183 |
| 2006/0095569 A1 | 5/2006 | O'Sullivan |
| 2006/0095570 A1 | 5/2006 | O'Sullivan |
| 2006/0106866 A1 | 5/2006 | Green et al. |
| 2006/0184667 A1 | 8/2006 | Clubb et al. |
| 2006/0218143 A1 | 9/2006 | Najork |
| 2006/0259830 A1 * | 11/2006 | Blevin et al. ................ 714/45 |
| 2006/0288149 A1 * | 12/2006 | LaVigne et al. ............. 710/306 |
| 2007/0150880 A1 * | 6/2007 | Mitran et al. ................. 717/161 |
| 2008/0148242 A1 * | 6/2008 | Cobb et al. ................... 717/130 |

OTHER PUBLICATIONS

Office Action dated Sep. 16, 2009 in U.S. Appl. No. 11/566,454.

U.S. Appl. No. 09/795,901, filed Feb. 28, 2001, "Adding Functionality to Existing Code at Exits," by Cobb.

U.S. Appl. No. 11/304,153, filed Dec. 15, 2005, "Execution Flow Shape Compression for Aggregate Data Reporting in an Application Manager," by Vanrenen et al.

"Using the WorkArea Facility," Version 4.0, WebSphere Application Server, IBM Corp., Mar. 2001.

Sodhi, et al. "Skeleton Based Performance Prediction on Shared Networks," CCGRID 2004: The IEEE International Symposium on Cluster Computing and the Grid, Apr. 2004, Chicago, IL.

"JSR 149: Work Area Service for J2EE," Sun Microsystems, www.jcp.org/en/jsr/detail?id=149&showPrint, printed Aug. 22, 2005.

* cited by examiner

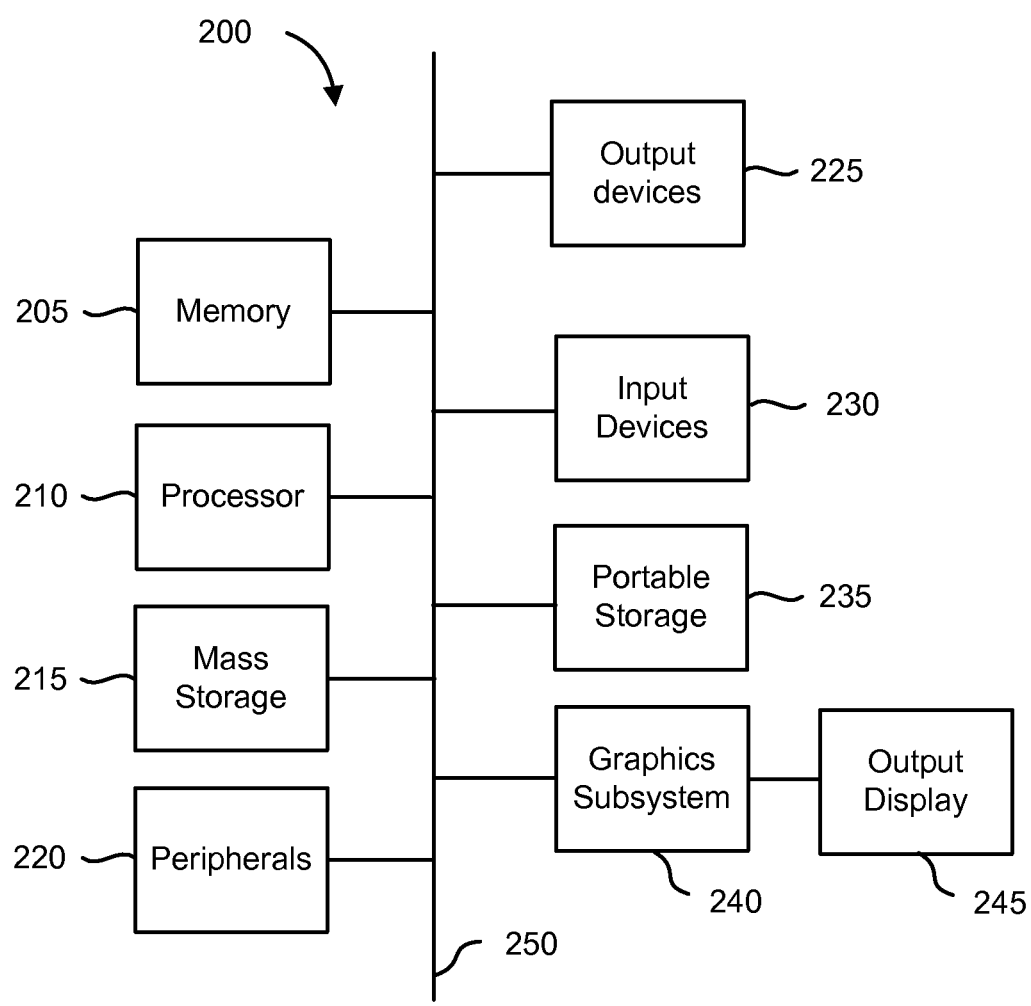

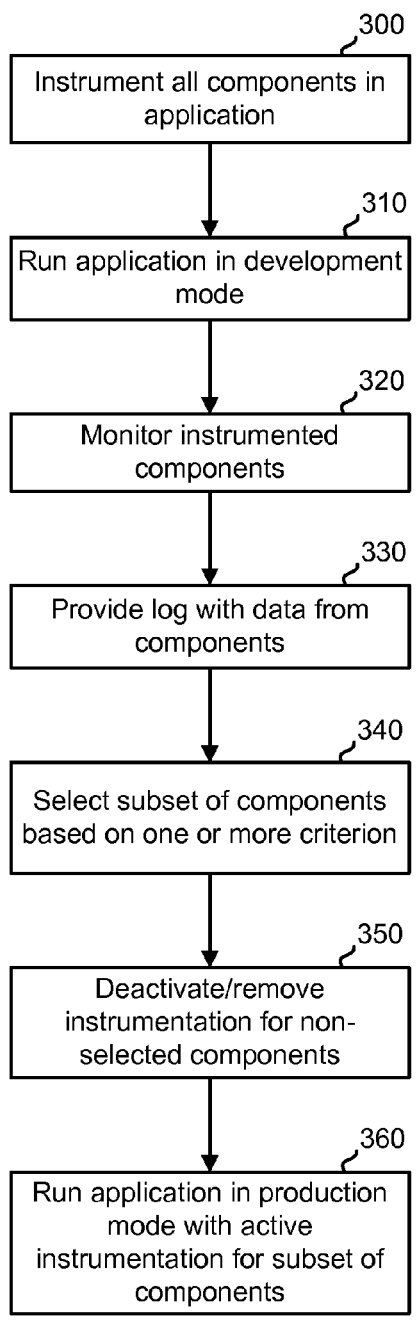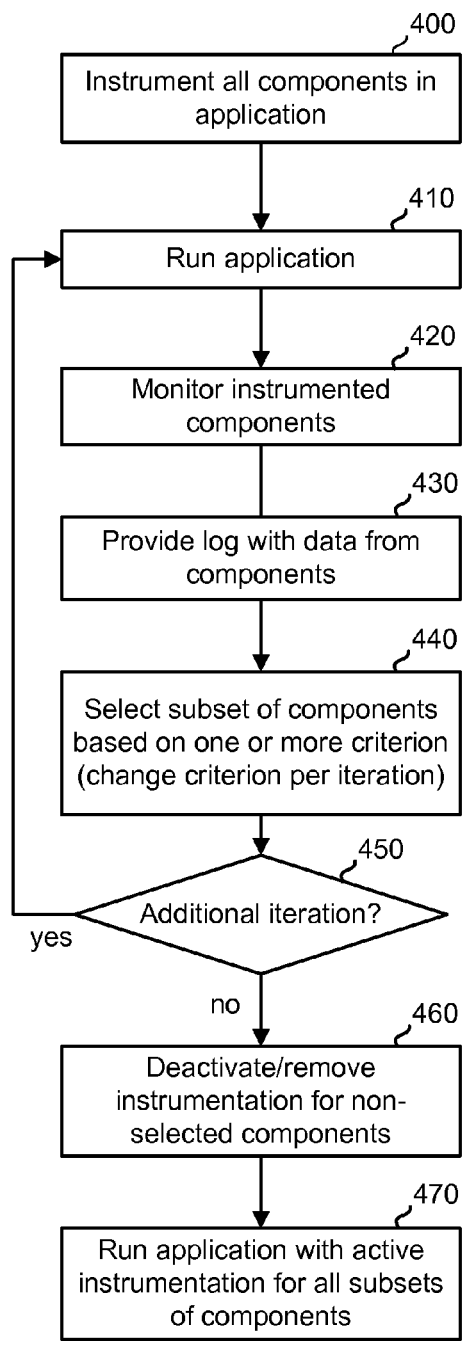

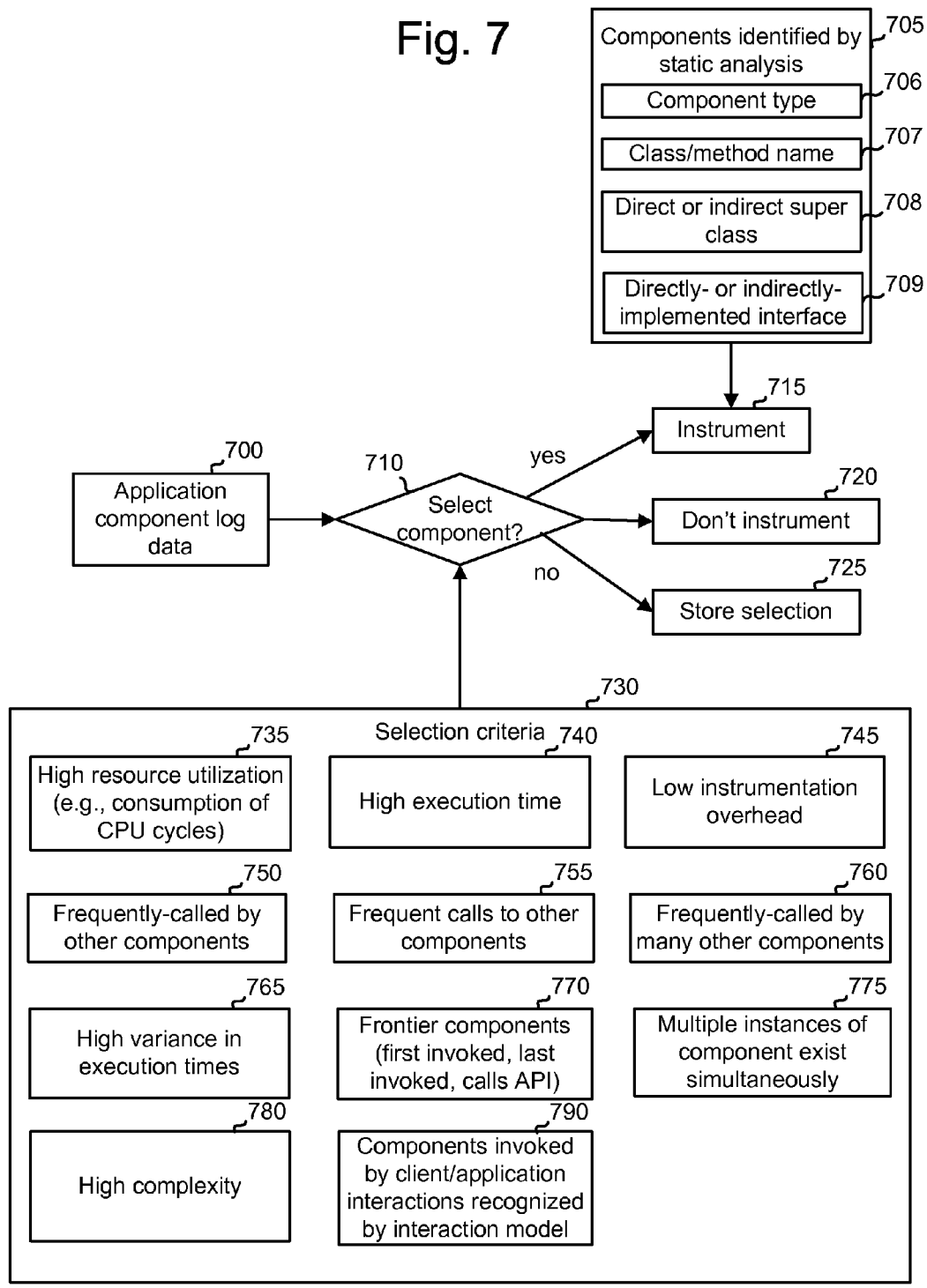

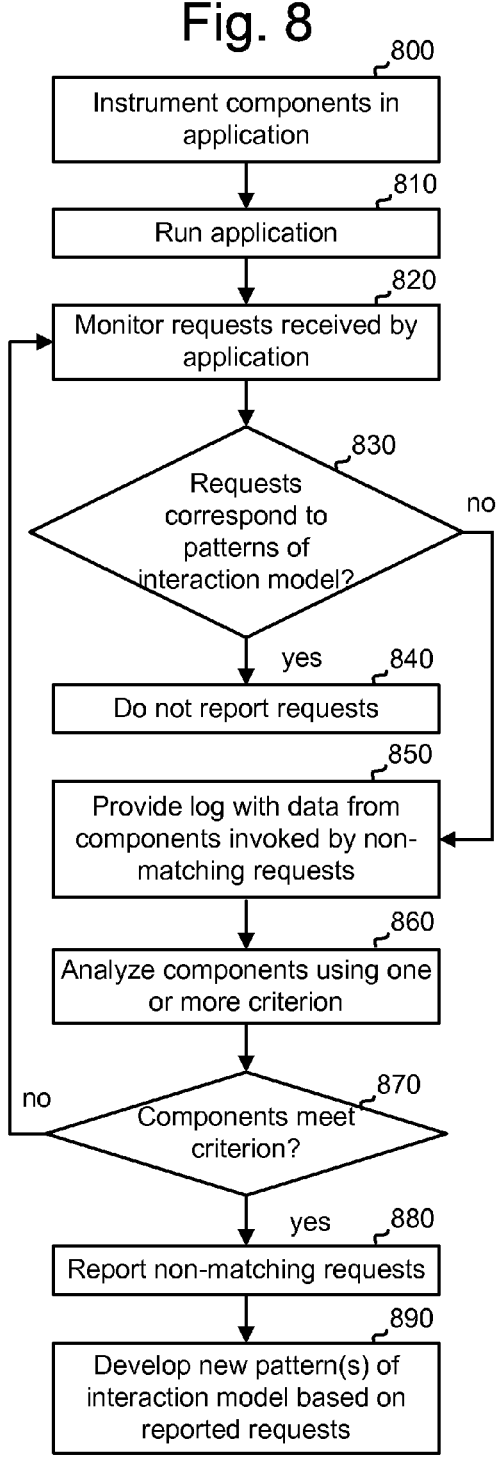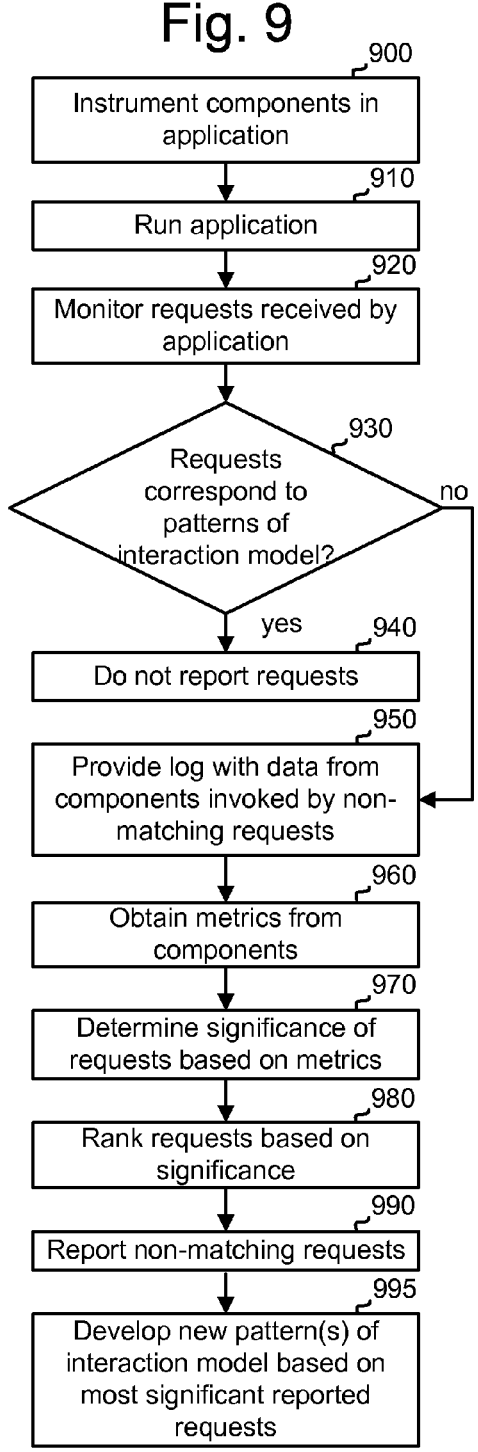

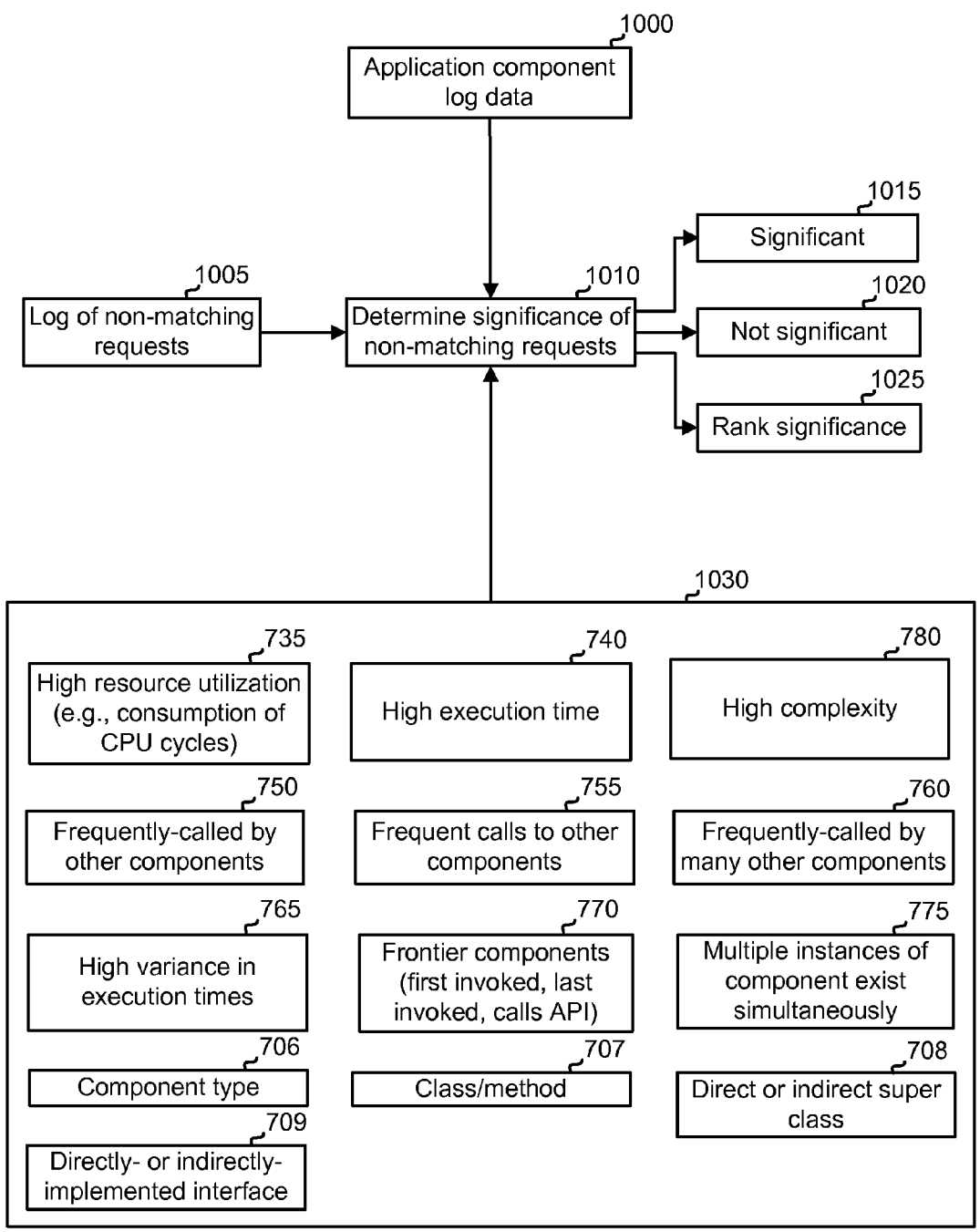

SELECTING INSTRUMENTATION POINTS FOR AN APPLICATION

CROSS-REFERENCE TO RELATED APPLICATIONS

This application is related to commonly-assigned U.S. patent application Ser. No. 11/565,490, filed Nov. 30, 2006, issued as U.S. Pat. No. 7,805,510 on Sep. 28, 2010, titled "Hierarchy For Characterizing Interactions With An Application" commonly-assigned U.S. patent application Ser. No. 11/566,454, filed Dec. 4, 2006, and published as US 2007/0266149 on Nov. 15, 2007, titled "Integrating Traffic Monitoring Data And Application Runtime Data", and commonly-assigned U.S. patent application Ser. No. 11/612,063, filed Dec. 18, 2006, and published as US 2008/0148242 on Jun. 19, 2008, titled "Optimizing An Interaction Model For An Application", each of which is incorporated herein by reference.

BACKGROUND OF THE INVENTION

Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that the applications perform as expected. To this end, various application management techniques have been developed.

One approach involves monitoring an application by instrumenting individual software components in the application, and collecting data regarding the instrumented components that are invoked when the application runs. Instrumentation can involve using agents that essentially live in the system being monitored. For example, instrumentation allows an execution flow, e.g., thread or process, to be traced to identify each component that is invoked as well as obtain runtime data such as the execution time of each component. However, determining which components to instrument can be problematic due to the difficulty in selecting components which can provide relevant data and the need to avoid excessive instrumentation overhead costs.

SUMMARY OF THE INVENTION

A method and system are provided for selecting instrumentation points and optimizing an interaction model which characterizes interactions with an application.

In one embodiment, a method for selecting instrumentation points for an application includes running an application having a first set of instrumented components, monitoring the instrumented components during the running and, based on the monitoring, selecting a subset of components of the first set of instrumented components for which active instrumentation is to be maintained. That is, a filtering process can be performed to reduce the number of components which are instrumented by monitoring the behavior of the components when the application runs. The application can run in a development mode where the overhead caused by instrumenting a large set of components is not problematic. Once a number of relevant components are identified, the application can be run in a production mode, gathering data from only the relevant components. The filtering process can occur in successive iterations as well, and can be based on static analysis in addition to dynamic analysis performed during the running of the application.

The application can be run by a human operator and/or load simulator interacting with the application. In one approach, the human operator and/or load simulator provide requests to the application which are associated with an interaction model, e.g., a model or template which characterizes interactions with the application. Such a model can be useful in understanding the way a client interacts with the application. Various criteria can be used for selecting instrumented components which are relevant to the interaction model. For example, the instrumented components can be selected by evaluating components which are invoked by requests which correspond to at least one pattern associated with an interaction model, or other interactions which are part of an interaction model. The selection can be made based on an order in which the instrumented components are invoked so that, for example, a first-invoked or last-invoked component is selected. The selection can also be made based on whether resource utilization, such as consumption of processor cycles, exceeds a threshold. Various other factors, including a combination of factors, can be used as well.

In another embodiment, a method for selecting instrumentation points for an application includes running an application in a development mode, providing a report indicating components of the application which were invoked during the running and processing the report for selecting one or more of the components to be instrumented in a production mode.

Corresponding systems and processor readable storage devices are provided.

BRIEF DESCRIPTION OF THE DRAWINGS

FIG. 2 is a block diagram of an embodiment of a computing system

FIG. 3 depicts a process for selecting components of an application to be instrumented.

FIG. 4 depicts an iterative process for selecting components of an application to be instrumented.

FIG. 7 depicts a conceptual diagram of a process for selecting components of an application to be instrumented.

FIG. 8 depicts a process for identifying significant requests to an application which do not correspond to a pattern of an interaction model.

FIG. 9 depicts a process for identifying significant requests to an application which do not correspond to a pattern of an interaction model, by ranking a significance of the requests.

FIG. 10 depicts a conceptual diagram of a process for identifying significant requests to an application which do not correspond to a pattern of an interaction model.

DETAILED DESCRIPTION

A method and system are provided for optimizing the selection of instrumentation points and optimizing an interaction model for an application.

Figure 1:
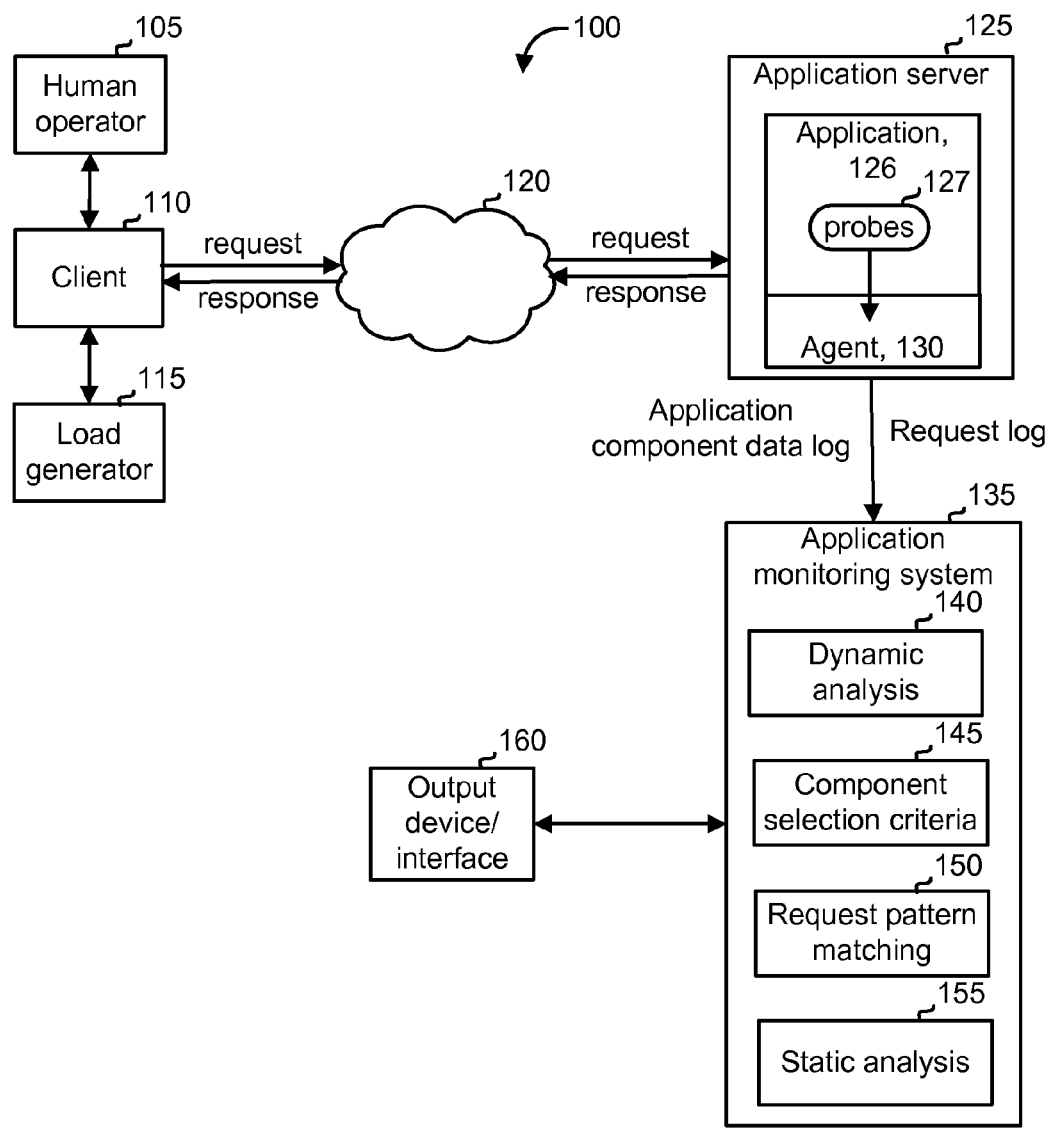
FIG. 1 depicts a system for monitoring an application.

FIG. 1 depicts a system for monitoring an application. The system, shown generally at 100, includes one or more clients 110, e.g., client software and or computing devices, which interact with an application 126 via a network 120 such as the Internet or other WAN, a LAN, intranet, extranet, private network or other network or networks. The client device 110 can be a laptop, PC, workstation, cell phone, PDA, or other computing device which is operated by an end user. Or, the client device can be an automated computing device such as a server. The application 126 may be located at an application server 125 or other network server, for example. In one embodiment, the application 126 is associated with an agent 130 which reports information to an application monitoring system 135 when the application executes.

One or more human operators 105 and/or load generators 115 can interact with the application via the client 110, such as by submitting requests to the application. For example, the human operator can be a trained operator who provides specific requests to the application to exercise the application in a test or development mode, that is, by entering various commands which are likely to be entered by other users when the application is placed in a production mode. Further, the commands can be chosen to be significant from the perspective of an interaction model which involves the application. For instance, for an application involving a business which includes an e-commerce web site, the operator may enter commands to login to the web site, shop, add to cart, checkout, track orders, contact customer service, and so forth. An interaction model can assist in understanding the demands which are made of an application so that computing and network resources can be efficiently deployed. Further, an interaction model can assist in trouble shooting problems with an application and in measuring application performance.

Alternatively, or additionally, a load generator 115 may be programmed to interact with the application via the client, such as by entering commands which are significant from the perspective of an interaction model. The load generator and client can be combined on one computing device or maintained separately, for instance. Further, a number of different operators and/or load generators may be used to interact with the application. In practice, a number of other network components which are not shown may be used, including routers, gateways, load balancing servers and the like.

The application 126 includes software components which are invoked when various execution paths are invoked in response to receipt of the requests. In particular, the application may respond to a request by accessing information, locally and or remotely, as necessary. For example, the application may access a database to obtain information for responding to a request. Once a response is prepared, it is communicated to the client 110 via the network 120. Further, instrumentation is provided for various components of the application, such as servlets, Java Server Pages (JSPs), Enterprise Java Beans (EJBs), Java Database Connectivity (JDBC) components and .NET components. Behavior of the application 126 can be monitored by instrumenting bytecode or intermediate language (IL) code of the application, by plugging into an exit built into the application or a network server, or by any other monitoring technique. In one possible approach, the application is instrumented by adding probes 127 to the application code. The probes may measure specific pieces of information regarding the application without changing the application's business logic. A probe may be thought of as a turnstile that is tripped when a component is invoked in an execution path. As the application runs, the probes 127 send data to the agent 130. The agent collects the data and sends it the application monitoring system, e.g., in a component data log.

More information about instrumenting bytecode can be found in U.S. Pat. No. 6,260,187, "System For Modifying Object Oriented Code" by Lewis K. Cirne, and U.S. patent application Ser. No. 09/795,901, "Adding Functionality To Existing Code At Exits," filed on Feb. 28, 2001, issued as U.S. Pat. No. 7,512,935 on Mar. 31, 2009, each of which is incorporated herein by reference in its entirety. More information regarding monitoring an application using probes can be found in U.S. Patent App. Pub. No. 2004/0075690, published Apr. 22, 2004, titled, "User Interface For Viewing Performance Information About Transactions", by Lewis K. Cirne, issued as U.S. Pat. No. 7,310,777 on Dec. 18, 2007, and incorporated herein by reference.

The instrumentation allows data to be gathered when the components are invoked during execution of the application. For example, the component data can include information such as average response time, errors per interval and invocations per interval. Further, the component data can indicate a utilization of resources by the components (e.g., CPU cycles), execution time, variance in execution times, component size, how frequently a component is called by other components, how frequently a component calls other components, how many different components call a given component, whether a component is a "frontier" component (which can include components that are invoked first or last in servicing a request, or which call an application programming interface (API)), how many instances of a component exist simultaneously and whether a component has a high complexity (a component has high complexity, e.g., when it is an entry point into another component, it makes other method calls so it doesn't just do all the work by itself, and/or it is above a certain length threshold).

The component data can be obtained for a single request and/or aggregated over many requests. Data from the instrumented components in the form of an application component data log is provided to the application monitoring system 135. Additionally, a request log may be used to maintain a record of the requests which are received by the application. The requests can be indexed to the component data in the log.

The application monitoring system 135 includes a number of facilities which can be used to process the information received from the agent 130. For example, a dynamic analysis module 140 analyzes the component data which is generated dynamically, e.g., when the application runs. The dynamic analysis module 140 can interact with a component selection criteria module 145 and a request pattern matching module 150. The component selection criteria module 145 can use a number of criteria which are applied to the component data. These criteria can include, e.g., one or more threshold values relating to: utilization of resources by the components, execution time, variance in execution times, component size, how frequently a component is called by other components, how frequently a component calls other components, how many different components call a given component, whether a component is a frontier component, how many instances of a component exist simultaneously and whether a component has a high complexity.

The request pattern matching module 150 operates on the request log to determine whether the requests correspond to at least one pattern of an interaction model for the application. For example, an interaction model for an application of an e-commerce web site can include the steps of: login to web site, shop, add to cart, checkout, track orders, contact customer service, and so forth. Further, a URL or URL component may be associated with each step. Thus, in one possible embodiment, a request includes: (a) a request for a component of a web page, (b) a request for a web page, or (c) a request for a set of web pages. The request can be parsed from the request log to obtain components of the request. The components, in turn, are analyzed and compared to the interaction model patterns. The analysis can be done in real-time, when a request is received by the application or at later time, based on a log of requests, for instance. If there is a correspondence, it is concluded that the client is invoking one or more steps of the interaction model which are defined by the patterns.

A static analysis module 155 analyzes components without running the application to identify components which are known, a priori, to be of interest. For example, a component may be analyzed statically based on its type as well as based on a name of a class or method/function with which the component is associated, a direct and/or indirect super class, or a directly- and/or indirectly-implemented interface. This is particularly true for applications that are developed using a set of best practices such as those provided by J2EE or .NET. Regarding component type, servlets, Java Server Pages (JSPs), Enterprise Java Beans (EJBs), Java Database Connectivity components and Microsoft .NET components are often frontier components and therefore worthy of instrumenting. JSPs provide a way to do scripting at the front end of a web server, while EJBs are business processing components that often do interesting work. The static analysis module 150 operates on the static application code and does not require access to the component data log. The static analysis can be achieved, e.g., using appropriate software which parses and analyzes application code to detect specific component types, classes and/or methods.

An output device/interface 160, which can include an on-screen interface, for example, can be used to provide reports and other information to an operator based on an output from the application monitoring system 135, as well to receive commands from the operator, such as for configuring the facilities of the application monitoring system 135.

FIG. 2 is a block diagram of an embodiment of a computing system, shown generally at 200, for use with the present technology. In one embodiment, the computing system may be used to implement client 110, application server 125, application monitoring system 135 and/or output device/interface 160 of FIG. 1. The computer system includes one or more processors 210 and main memory 205 which stores, in part, instructions and data for execution by processor 210. If the system of the present invention is wholly or partially implemented in software, main memory 205 can store the executable code when in operation. Also provided are a mass storage device 215, peripheral device(s) 220, output devices 225, user input device(s) 230, portable storage 235, a graphics subsystem 240 and an output display 245. For simplicity, the components are depicted as being connected via a single bus 250. However, the components may be connected through one or more data transport means. Mass storage device 215, which may be implemented with a magnetic disk drive or an optical disk drive, for instance, is a non-volatile storage device for storing data and instructions for use by processor 210. In one embodiment, mass storage device 210 stores the system software for implementing the present invention for purposes of loading to main memory 205.

Portable storage 235 can operate with a portable non-volatile storage medium to input and output data and code to and from the computer system. In one embodiment, the system software for implementing the present invention is stored on such a portable medium, and is input to the computer system via the portable storage 235. Peripheral device(s) 220 may include any type of computer support device, such as an input/output interface, to add functionality to the computer system. For example, peripheral device(s) 220 may include a network interface for connecting the computer system to a network, a modem, a router, etc.

User input device(s) 230 provides a portion of a user interface and may include, e.g., a pointing device, such as a mouse, a trackball, stylus, or cursor direction keys. In order to display textual and graphical information, the computer system includes graphics subsystem 240 and an output display 245 such as a cathode ray tube (CRT) display, liquid crystal display (LCD) or other suitable display device. Graphics subsystem 240 receives textual and graphical information, and processes the information for output to output display 245. Additionally, the computer system includes output devices 225 such as speakers, printers, network interfaces, monitors, etc.

The components contained in the computer system are those typically found in computer systems suitable for use with the present invention, and are intended to represent a broad category of such computer components that are well known in the art. Thus, the computer system can be a personal computer, hand held computing device, telephone, mobile computing device, workstation, server, minicomputer, mainframe computer, or any other computing device. The computer system can also include different bus configurations, networked platforms, multi-processor platforms, etc. Various operating systems can be used as well, including Unix, Linux, Windows, Macintosh OS, Palm OS, and other suitable operating systems.

FIG. 3 depicts a process for selecting components of an application to be instrumented. Note that in this and the other flowcharts provided, the steps indicated are not necessarily performed one at a time in the order indicated, but may occur simultaneously, at least in part, and/or in another order. Additionally, results from any step of the processes can be reported, e.g., via output files, user interface displays or the like. As mentioned at the outset, determining which components to instrument in an application can be problematic due to the difficulty in selecting components which can provide relevant data for analyzing an application and the need to avoid excessive instrumentation overhead costs. In one approach, all or essentially all of the components in an application are instrumented (step 300). Optionally, some set of components which includes less than all components is instrumented. In practice, the application thus instrumented can be run in a development mode such as in a laboratory in which the instrumentation overhead costs are not problematic (step 310). For example, a human user and/or load generator may interact with the application to perform specific tasks such as those that are associated with an interaction model. At step 320, the instrumented components are monitored as the application runs. This may be achieved, e.g., by probes in the application sending component data to an agent when the instrumented components are invoked. At step 330, a log with data from the monitored components is provided, e.g., from the agent to the application monitoring system. The log can be provided after a session of running the application, or periodically during the session, for instance. At step 340, a subset of the instrumented components of the application is selected based on one or more criterion applied to the log data. Essentially, the subset of components includes components which are determined to be of interest based on the one or more criterion. That is, the one or more criterion is used to provide a filter to identify a subset of the components which may have special importance and therefore should be instrumented.

In particular, as mentioned, the criterion can include, e.g., one or more threshold values relating to utilization of resources by the components, execution time, variance in execution times, component size, how frequently a component is called by other components, how frequently a component calls other components, how many different components call a given component, whether a component is a frontier component, how many instances of a component exist simultaneously and whether a component has a high complexity. The component data in the log can be processed based on these criteria. Moreover, one criterion or a combination of separate criteria can be applied. For example, the component log may indicate that component "A" has an execution time of T1. A criterion may indicate that a component carries relevant information if its execution time is above a threshold TH1. Thus, step 340 can include determining whether T1 exceeds TH1. If it does, component "A" is included in the subset as a selected component. An appropriate data structure can be used to identify components which are included in the subset. Similarly, if T1 does not exceed TH1, component "A" can be identified as not being included in the subset, or, similarly, as being included in a group of non-selected components.

Once the subset of components is selected, instrumentation is not needed for the other, non-selected components which are not in the subset. In one approach, the instrumentation can be deactivated or removed for the non-selected components (step 350). In one embodiment, instrumentation is deactivated by turning off the probes for the non-selected components. In this case, the probes remain in the application but are not active and do not send data to the agent. In another approach, the instrumentation, e.g., probes, for the non-selected components is removed. For instance, classes which include non-selected components can be re-written without the instrumentation for the non-selected components and reloaded. In some cases, this can be done on-the-fly, as an application is running, depending on the capabilities of the virtual machine on which the application runs. In other cases, the application is temporarily taken offline to modify the instrumentation.

At step 360, the application with active instrumentation provided for only the subset of components is run, e.g., in a production mode, thereby allowing relevant information to be gathered while avoiding excessive instrumentation overhead.

FIG. 4 depicts an iterative process for selecting components of an application to be instrumented. The process shown is analogous to that of FIG. 3 but allows for a number of iterations in selecting a subset of components to be instrumented. For example, it may be desirable to run the application in successive time periods and select a subset of components in each time period. The components may be overlapping or non-overlapping in the different subsets. Steps 400-430 correspond to steps 300-330, respectively, of FIG. 3. At step 440, a subset of components is selected based on one or more criterion applied to the component data log, for instance. Moreover, the criterion which is applied can be changed in each iteration. For example, a criterion regarding execution time can be applied in one iteration, a criterion regarding a variance in execution time can be applied in another iteration and a criterion regarding number of components called can be applied in yet another iteration. This allows an operator to identify the components which are selected by each criterion. Also, a more exclusive criterion can be applied in each successive iteration while allowing an operator to identify the components which are selected in each iteration. For example, a criterion regarding a first execution time T1 can be applied in one iteration, while a criterion regarding a second execution time T2 can be applied in another iteration. T2 provides a more exclusive filtering criterion when T2>T1 and when fewer execution times are above T2 than T1.

At decision block 450, a determination is made as to whether another iteration is desired. For instance, if the process involves cycling through a different selection criterion in each iteration, another iteration will be performed if there are any criterion which have not yet been applied. In another approach, the decision can involve assessing the components that have already been selected. For example, if the number of selected components is below a threshold, or an amount of instrumentation overhead is less than a threshold, an additional iteration may be performed to select additional components. If no additional iteration is desired, the instrumentation for the non-selected components is deactivated or removed at step 460 and, at step 470, the application can be run with active instrumentation for all subsets of selected components. If an additional iteration is desired at decision block 450, the application is run again at step 410 and additional component data is gathered.

In one option, the process can iteratively refine a single subset of selected components. In this case, step 460 can be performed prior to decision block 450 so that the non-selected components are deactivated or removed before each new iteration. For example, a more exclusive criterion can be applied in each successive iteration. To illustrate, a criterion regarding a first execution time T1 can be applied in one iteration, while a criterion regarding a more exclusive second execution time T2 can be applied in a next successive iteration. Components in the subset which do not meet the more exclusive criterion can be removed in each iteration so that only the components which meet the most exclusive criterion remain in the subset after the last iteration.

Figure 5:
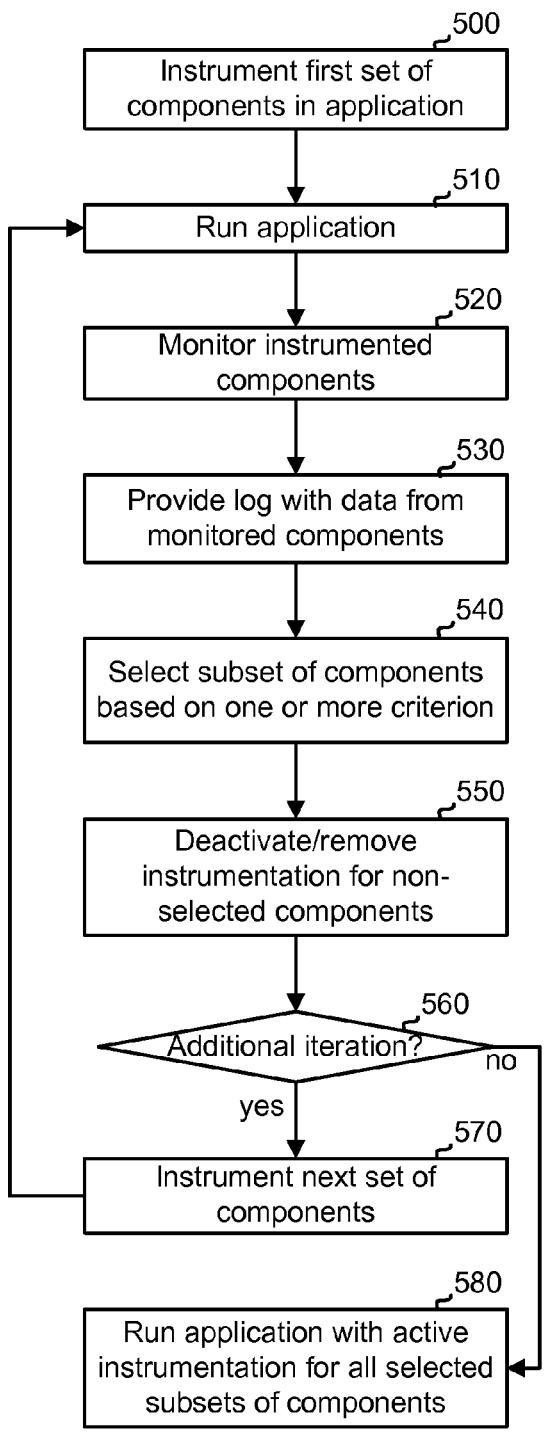
FIG. 5 depicts a piecemeal process for selecting components of an application to be instrumented.

FIG. 5 depicts a piecemeal process for selecting components of an application to be instrumented. Here, different sets of components are instrumented in different iterations and a determination is made separately for each iteration as to which components in each set are important enough to instrument. This approach reduces the instrumentation overhead which is present at a given time and therefore can be used, e.g., in a production environment where excessive instrumentation overhead is undesirable. At step 500, a first set of components in the application is instrumented. For example, components associated with particular classes or methods "A"-"M" can be instrumented. At step 510, the application is run and, at step 520 the instrumented components are monitored, e.g., by probes. At step 530, a log with data from the monitored components is provided and, at step 540, a subset of the components is selected based on one or more criterion. At step 550, the instrumentation for non-selected components in the set is deactivated or removed from the application. At decision block 560, if an additional iteration is to be made, a next set of components is instrumented at step 570 and the application is run again at step 510. For example, components associated with other classes or methods "N"-"Z" can be instrumented in a second iteration. At step 580, if no additional iteration is to be made, the application is run with active instrumentation for all selected subsets of components. In another approach, all instrumentation can be removed after each iteration and added back into the selected subsets of components after all iterations are completed.

The process of FIG. 5 can be modified to provide an iterative process for selecting components of an application to be instrumented. In one possible approach, step 540 is modified to select a new set of components based on one or more criterion. For example, after the first set of components is instrumented, the new set of components can be a second set which can include one or more new components which are not in the first set and/or one or more components which are in the first set. Further, the second set can include all new components, none of which is in the first set. Step 580 is modified to refer to running the application with active instrumentation for the current set of components. This approach can provide a drill-down capability in which the initial set of instrumented components can be expanded. Also, a capability can be provided for adding instrumentation back to some components for which the instrumentation was previously deactivated.

Figure 6:
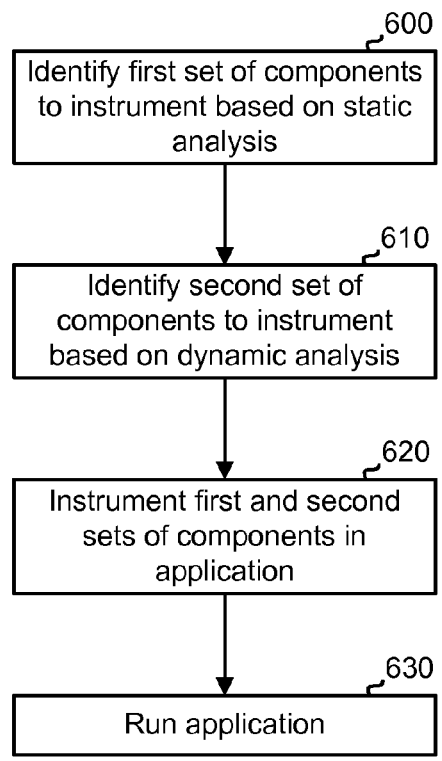
FIG. 6 depicts a process for selecting components of an application to be instrumented using static and dynamic analysis.

FIG. 6 depicts a process for selecting components of an application to be instrumented using static and dynamic analysis. Static analysis involves analyzing application code to identify components which are known, a priori, to be of interest and therefore worthy of instrumenting. For example, a component may be analyzed statically based on its type and/or based on a name of a class or method/function with which the component is associated. Further, a component may be analyzed based on a direct or indirect super class, or a directly- or indirectly-implemented interface. For instance, as mentioned, regarding component type, servlets, Java Server Pages (JSPs), Enterprise Java Beans, Java Database Connectivity components and/or Microsoft .NET components are often frontier components and therefore worthy of instrumenting. The component type can be identified, e.g., by a standardized syntax used by the type. The static analysis can therefore identify these components and flag them to be instrumented in an appropriate report. In contrast, dynamic analysis involves analyzing data obtained from a running, e.g., executing, application. For instance, the dynamic analysis may operate on the component log data provided by an instrumented application, as discussed. Advantageously, while static and dynamic analysis can be performed separately, both types of analyses can be combined to identify components for which instrumentation should yield relevant information.

In particular, at step 600, a first set of components to be instrumented is identified based on static analysis. At step 610, a second set of components to instrument is identified based on dynamic analysis. These steps can be performed independently, as mentioned. At step 620, the first and second sets of components are instrumented in the application and, at step 630, the application is run. Note that there may be some overlap in the first and second sets as the same components identified by static analysis may also be identified by dynamic analysis.

FIG. 7 depicts a conceptual diagram of a process for selecting components of an application to be instrumented using selection criteria. Decision block 710 indicates a decision which is made as to whether to instrument one or more components (block 715) or not instrument one or more components (block 720). The selection decision is stored (block 725). The selection decision process can be based on application component log data (block 700) and one or more selection criteria (block 730) applied to the component log data. The selection criteria can include, e.g., high resource utilization (block 735), high execution time (block 740), low instrumentation overhead (block 745), whether a component is frequently called by other components (block 750), whether a component makes frequent calls to other components (block 755), whether a component is frequently called by many other different components (block 760), high variance in execution time (block 765), whether a component is a frontier component such as a first invoked or last invoked component or a component which calls an API (block 770), whether multiple instances or, generally, a given number of instances of a component exist simultaneously (block 775), whether a component has high complexity (block 780) and whether a component is invoked by client/application interactions, such as requests, which are recognized by an interaction model (block 790).

Regarding low instrumentation overhead (block 745), this can refer, in one approach, to a ratio of CPU cycles consumed by instrumentation of a component to CPU cycles consumed when the instrumented component is invoked, e.g., by a method call.

In one approach, scores can be assigned to the components for each selection criteria, and a total score indicates whether a component is selected at decision block 710. The different scores for the different selection criteria can have different weights as well so that relatively more important criteria are weighted more heavily. Any type of scoring scheme can be used.

Additionally, components identified by static analysis (block 705) such as by component type (block 706), associated class/method (block 707), associated direct or indirect super class (block 708) and/or an associated directly- or indirectly-implemented interface (block 709) can be flagged for instrumentation (step 715).

FIG. 8 depicts a process for identifying significant requests to an application which do not correspond to a pattern of an interaction model. As mentioned previously, interactions between one or more clients and an application can be analyzed to determine whether they are recognized by an interaction model. An interaction model can broadly encompass activities of different entities such as a for-profit business, non-profit organization, educational organization or government organization, for instance. For example, requests to an application, such as requests for components of a web page, a web page or a set of web pages, can be compared to patterns which represent relevant steps in an interaction model. To illustrate, an e-commerce business process might include steps such as login, shop, add to cart and checkout. Another example of an interaction model involves an employee logging on to a corporate intranet site to submit a form to the human resources department. Many other interaction models can be defined to represent important tasks that a client (whether human-controlled or automated) may perform in interacting with an application. However, it is important to be able to evaluate whether the interaction model is accurate and to identify new patterns which are relevant and which should be added to the interaction model. For example, an interaction model may be incomplete if it omits coverage of certain tasks that consume significant resources of the application such as processing cycles. Also, it can be valuable to identify defined patterns with a low relevance. Similarly, it can be useful to understand the activity of an application when requests which are recognized by an interaction model are provided.

At step 800, components in an application are instrumented. This can include essentially all of the components or some group of components which may provide relevant data. At step 810, the application is run. At step 820, requests received by the application are monitored, and at decision block 830, a determination is made as to whether the requests correspond to one or more patterns of an interaction model. In one approach, the determination can be based on comparing one or more URLs in one or more requests to one or more URLs in a pattern. For example, each request may be parsed to determine query, cookie, post, URL and session type name/value pairs. A typical HTTP post request which can be parsed is shown below.

Request-line: POST /dir/file.html?query1=q1&query2=q2 HTTP/1.1\r\n
request-headers: Content-type: application/x-www-form-urlencoded\r\n
   Host: www.company.com\r\n
   Cookie: cookie1=c1; cookie2=c2\r\n
   Referer: https://www.company.com/dir/home.html?action=login\r\n
\r\n
request-body: post1=p1&post2=p2

An example of an HTTP parameter list derived from parsing the above request is shown below. Each parameter includes a type and name/value pair.
type="Query", name="query1", value="q1"
type="Query", name="query2", value="q2"
type="Cookie", name="cookie1", value="c1"
type="Cookie", name="cookie2", value="c2"
type="Post", name="post1", value="p1"
type="Post", name="post2", value="p2"
type="Url", name="Host", value="www.company.com"
type="Url", name="Path", value="/dir/file.html"
type="Url", name="Url", value="www.company.com/dir/file.html?query1=q1&query2=q2"
type="Url", name="Referer", value="www.company.com/dir/home.html?action=login"

The parameter list data can be retrieved from the request listed above. In particular, the parameter list query data can be retrieved from the request-line of the request, the cookie data can be retrieved from the request headers, the post data can be retrieved from the request body, and the URL data can be retrieved from the request header and request line. A request can be processed by comparing parameters in the request to parameters in different interaction model patterns to locate a corresponding pattern. If there is no match, the request is considered to be a non-matching request.

If there is a correspondence between the request and an interaction model pattern at decision block 830, the requests are not reported at step 840, in one approach. This approach can be taken when there is a focus on identifying non-matching requests. If there is no correspondence between the request and an interaction model pattern at decision block 830, a log is provided with data from the monitored components which are invoked by the non-matching requests (step 850). In another approach, the log also includes data from components which are invoked by matching requests. A separate log can be provided for data from the components which are invoked by the matching requests as well. At step 860, the components are analyzed using one or more criterion (see FIG. 10) to determine whether significant activity is invoked in the application by the request. If the components meet the criterion at decision block 870, the non-matching requests are reported at step 880. One or more new patterns of an interaction model can be developed based on the reported requests at step 890. For example, non-matching requests that generate significant activity such as resource utilization in the application can be used as new patterns so that the interaction model is more closely aligned with the application activity. The process can therefore reveal significant interactions with an application which may have previously been overlooked.

If the components do not meet the criterion at decision block 870, it is concluded that the non-matching requests do not generate significant activity in the application, and monitoring continues at step 820 without reporting the non-matching requests.

FIG. 9 depicts a process for identifying significant requests to an application which do not correspond to a pattern of an interaction model, by ranking a significance of the requests. It is also possible to rank the non-matching requests according to their significance based on metrics which are applied to the invoked components. In this case, the highest ranked non-matching requests can be used as new patterns. Steps 900-950 correspond to steps 800-850, respectively, in FIG. 8. At step 960, metrics (see FIG. 10) are obtained from the components which are invoked by the non-matching requests. At step 970, a significance of the requests is determined based on the metrics of the associated invoked components. For example, a request will have a higher significance when the associated invoked components have a higher significance as indicated by the metrics. At step 980, the non-matching requests are ranked based on their significance and, at step 990, the non-matching requests are reported with a significance ranking or score. The most significant reported non-matching requests can be used to develop one or more new patterns for the interaction model (step 995), in one approach.

It is also possible to rank the matching requests based on metrics derived from components which they invoke. The matching requests can be ranked separately from, or together with, the non-matching requests.

FIG. 10 depicts a conceptual diagram of a process for identifying significant requests to an application which do not correspond to existing patterns of an interaction model. The significance of non-matching requests is determined (block 1010). This determination may be made based on application component log data (block 1000) and a log of non-matching requests (block 1005). Note that the application component log data and the log of non-matching requests can include information which allows cross-referencing. For example, the application component log data can include an indication of one or more requests which invoked a component. The determination at block 1010 can indicate that components are significant (block 1015) or not significant (block 1020). Additionally, or alternatively, the significance can be ranked (block 1025).

The determination at block 1010 can be based on one or more metrics and/or criterion applied to the invoked application components. These metrics and/or criterion can include those mentioned previously, such as high resource utilization (block 735), high execution time (block 740), whether a component has high complexity (block 780), whether a component is frequently called by other components (block 750), whether a component makes frequent calls to other components (block 755), whether a component is frequently called by many other different components (block 760), high variance in execution time (block 765), whether a component is a frontier component such as a first invoked or last invoked component or a component which calls an API (block 770) and whether multiple instances or, generally, a given number of instances of a component exist simultaneously (block 775). The metrics and/or criterion can also include component type (block 706), associated class/method (block 707), associated direct and/or indirect super class (block 708), and associated directly- and/or indirectly-implemented interface (block 709). Also, the determination at block 1010 can include metrics or criterion derived from the requests themselves, such as the frequency with which a request is made. For instance, the significance score of a request can be increased when the request is frequently-made.

In one approach, scores are assigned for each selection criteria and a total score indicates whether a request is selected at decision block 1010. The different scores for the different selection criteria can have different weights as well so that relatively more important criteria are weighted more heavily. Any type of scoring scheme can be used.

Figure 11:
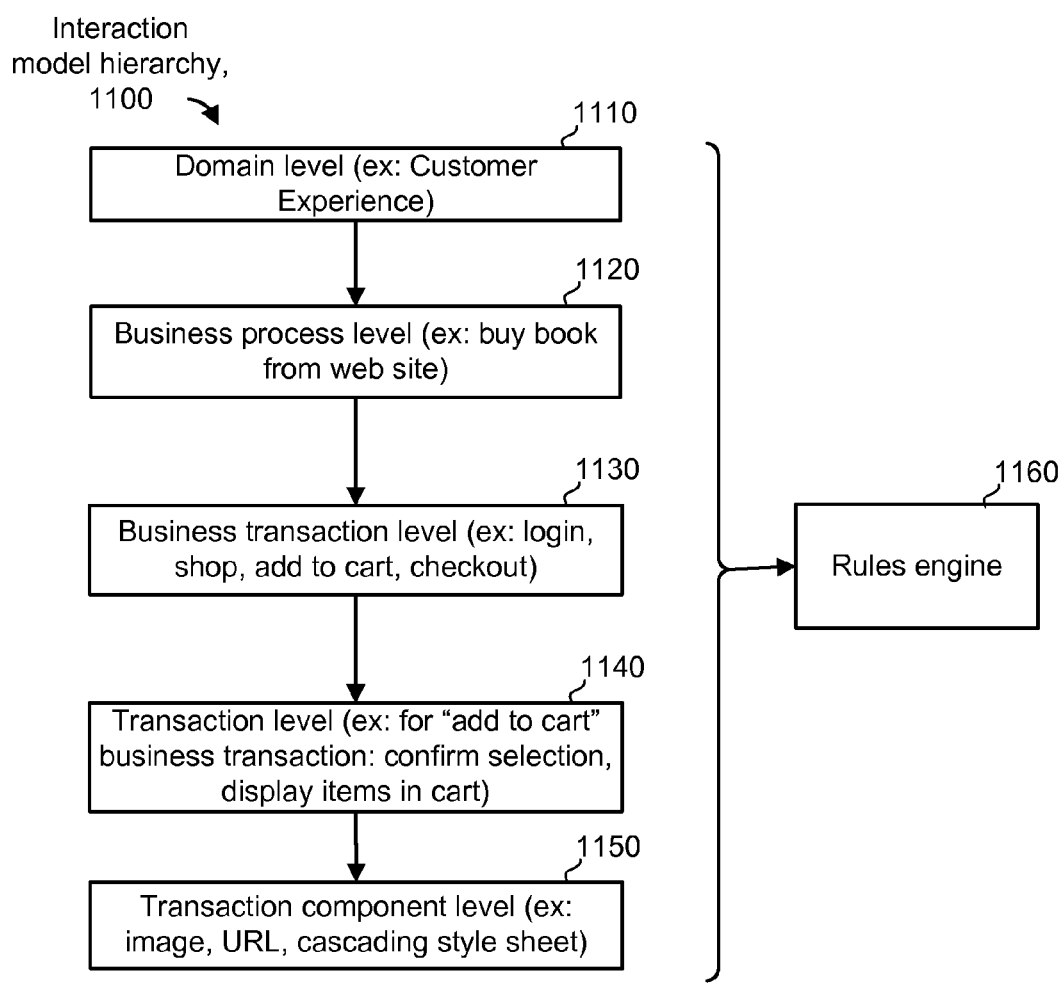
FIG. 11 depicts a hierarchical interaction model for classifying interactions with an application.

FIG. 11 depicts a hierarchical interaction model for classifying interactions with an application. As mentioned, an interaction model can be provided for classifying interactions with an application. In one approach, the interaction model is hierarchical. The different levels of the hierarchy can be defined based on any desired organizational structure. For example, the hierarchy can include human-facing terminology, that is, terminology which facilitates human understanding of client's interactions with a monitored application. In one approach, the different levels of the hierarchy characterize a client's interaction with an application from the client's perspective at various degrees of breadth. Furthermore, the interaction may be viewed from a perspective of the client machine of a user/operator or a machine such as a web server which is between a client machine and the application.

The example hierarchy 1100 includes five levels, although one or more levels can be used. A top level of the hierarchy is a domain level 1110 named "Customer Experience."

A next level of the hierarchy is a business process level 1120. An example of a business process is buying a book from a web site, for instance. Other example business processes for a book-selling web site can include "Search Books," "Contact Customer Service," and "Track Order." Another example of a business process involves employees enrolling in a benefits program, in which case the business process can be named, e.g., "Enroll in benefits".

A next level of the hierarchy is a business transaction level 1130. A business process can be made up of a number of business transactions. For example, for the business process of buying a book from a web site, the business transactions can include business transactions of logging in to the web site, such as by entering a user id and password, shopping on the web site, such as by viewing different items for sale, adding a selected item to a shopping cart, and completing a checkout process, such as by entering payment and shipping information.

A next level of the hierarchy is a transaction level 1140. A business transaction can be made up of a number of individual transactions. For example, the class of business transactions named "Add To Cart" may include classes of transactions named "confirm selection" and "display items in cart." In one approach, each transaction is associated with a web page. For example, a first web page may ask the user to confirm a selection and a second web page may display the items in the cart. In another example, a "checkout" business transaction may include transactions for confirming a purchase, entering payment information and entering shipping information.

A bottom level of the hierarchy is a transaction component level 1150. A transaction can be made up of one or more transaction components, such as components of a web page. These components can include, e.g., images (e.g., .gif files), cascading style sheets (e.g., .css files), JavaScript code components (e.g., .js files) and so forth.

The interaction model hierarchy can be expressed in terms of a rules engine 1160 which includes patterns. The rules engine can be used by the application monitoring system, for instance, for comparing the patterns to requests which are received by the application to determine whether they are matching or non-matching requests. It is also possible for another entity such as a traffic monitoring system which monitors traffic between the application and a client to implement the rules engine and to provide matching/non-matching status information to the application monitoring system.

Further related information regarding a hierarchy can be found in U.S. patent application publication no. 2003/0191989 to P. O'Sullivan, published Oct. 9, 2003, titled "Methods, systems and computer program products for triggered data collection and correlation of status and/or state in distributed data processing systems," and incorporated herein by reference.

Figure 12:
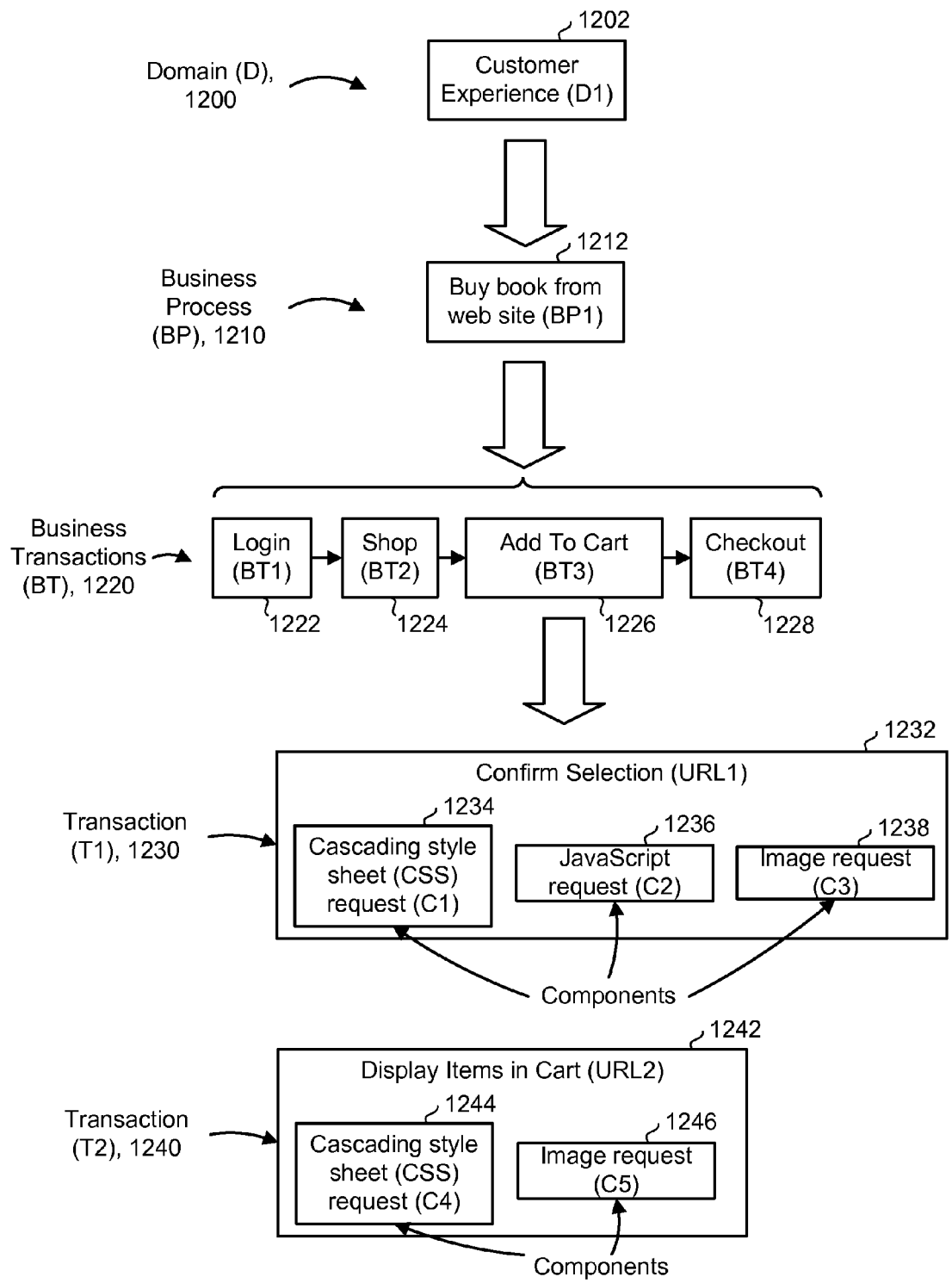
FIG. 12 depicts details of an example interaction model hierarchy for the business process of buying a book from a web site.

FIG. 12 depicts details of an example interaction model hierarchy for the business process of buying a book from a web site. The domain (D) level 1200 includes a "Customer Experience" (CE) class (D1) 1202. The business process (BP) level 1210 includes a class 1212 for buying a book from the web site. The business transaction (BT) level 1220 includes a class for "Login" 1222, a class for "Shop" 1224, a class for "Add To Cart" 1226 and a class for "Checkout" 1228. An instance of the class for "Add To Cart" 1226 includes different individual transactions 1230 and 1240. For example, transaction 1230 ("confirm selection") includes a web page request 1232 such as a first URL (URL1) which includes a number of example components, e.g., a cascading style sheet request 1234, a JavaScript component request 1236 and an image request 1238. Another transaction 1240 ("display items in cart") similarly includes a web page request 1242 such as a second URL (URL2) which includes example components, e.g., a cascading style sheet request 1244 and an image request 1246. Additional transactions may be included as well. C1-C5 denote respective transaction components which are also web page components.

The rules engine can define how to identify a transaction component based on the characteristics of a request-response pair. In one approach, the request can be analyzed by the rules engine to determine whether the request corresponds to a level of the hierarchy. For example, some levels of the hierarchy can be associated with a sequence of multiple requests, e.g., the domain level 1110, business process levels 1120, business transaction level 1130 and the transaction level 1140 (FIG. 11) while other levels can be associated with a single request, e.g., the transaction component level 1150. The analysis can be done in real-time, when a request is received by the application or at later time, based on a log of requests, for instance.

In one approach, the application monitoring system implements the rules engine in the request pattern matching module 150 (FIG. 1). The application monitoring system obtains a request and uses the set of rules/patterns defined in the rules engine to determine whether the request corresponds to one or more transaction components, transactions, business transactions, business process and/or domains. In particular, an in-memory rule engine can operate as follows:

1. For every component invocation, obtain characteristics of the associated request, such as (a) URL host name and port, b) URL parameters, c) HTTP post parameters, d) cookie parameters, e) session manager parameters and others.

2. Given these request characteristics, determine the business transaction and business process to which the request belongs.

3. Identify the transaction components using a sorted set of regular expressions—one regular expression for each possible transaction component. For each request, start matching the request against this set of regular expressions, one-by-one. The first match identifies the transaction component to which the request corresponds.

4. Identify the transaction, business transaction, business process and domain using an in-memory tree. Create a tree of the hierarchy, including the transaction component level, the transaction level, the business transaction level, the business process level and the domain level. Once the transaction component is known for a request, the tree can be traversed to determine the other levels of the hierarchy to which the request corresponds.

The functionality described herein may be implemented using one or more processor readable storage devices having processor readable code embodied thereon for programming one or more processors. The processor readable storage devices can include computer readable media such as volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method for selecting instrumentation points for an application, comprising:
   performing a static analysis of components of an application, the performing the static analysis comprises determining which of the components are worthy of instrumenting, the determining which of the components are worthy of instrumenting comprises determining which of the components are of at least one specific type which is of interest;
   instrumenting the components which are determined to be worthy of instrumenting based on the static analysis to provide a first set of components, each component of the first set of components is instrumented with a probe which is initially made active so that the probe will be tripped and send component data to an agent when the component of the first set of components is invoked;
   in one iteration of a filtering process:
      running the application with the first set of components while monitoring the first set of components based on probes of the first set of components,
      based on the monitoring of the first set of components, for each component of the first set of components:
         assigning a first score based on a first selection criterion, assigning a second score based on a second selection criterion, and providing a total score based on the first score and the second score and
      based on the total scores, distinguishing a first subset of components of the first set of components for which active instrumentation is to be maintained from a second subset of components of the first set of components for which active instrumentation is not to be maintained; and
   in another iteration of the filtering process:
      running the application with the first subset of components while keeping probes for the first subset of components active and making probes for the second subset of components inactive, where the probes for the second subset of components remain in the application, and do not send component data to an agent, in the another iteration, and while monitoring the first subset of components based on the probes of the components of the first set of components,
      based on the monitoring the first subset of components, assessing the first subset of components using another selection criterion, and
      based on the assessing the first subset of components, distinguishing a subset of the first subset of components for which active instrumentation is to be maintained in subsequent running of the application from a subset of the first subset of components for which active instrumentation is not to be maintained in the subsequent running of the application.

2. The computer-implemented method of claim 1, wherein: the distinguishing during the one iteration comprises parsing HyperText Transport Protocol (HTTP) requests to the application to obtain parameters of the HTTP requests, comparing the parameters of the HTTP requests to at least one pattern associated with an interaction model for the application to determine at least one of the HTTP requests which corresponds to the at least one pattern associated with the interaction model for the application, and selecting the first subset of components by selecting components of the first set of components which are invoked by the at least one of the HTTP requests.

3. The computer-implemented method of claim 1, wherein: the distinguishing during the one iteration comprises selecting the first subset of components by selecting components of the first set of components based on an order in which the components of the first set of components are invoked during the running of the application with the first set of components.

4. The computer-implemented method of claim 1, wherein: the distinguishing during the one iteration comprises selecting the first subset of components by selecting components of the first set of components for which a resource utilization exceeds a threshold during the running of the application with the first set of components.

5. The computer-implemented method of claim 1, wherein: the distinguishing during the one iteration comprises selecting the first subset of components by selecting components of the first set of components for which at least one of a consumption of processor cycles or an execution time exceeds a threshold during the running of the application with the first set of components.

6. The computer-implemented method of claim 1, further comprising:
   determining an instrumentation overhead of each component of the first set of components during the running of the application with the first set of components, based on a ratio of central processing unit (CPU) cycles consumed by instrumentation of each component of the first set of components to CPU cycles consumed when each component of the first set of components is invoked, the distinguishing during the one iteration comprises selecting the first subset of components by selecting components of the first set of components for which the instrumentation overhead is determined to be below a threshold.

7. The computer-implemented method of claim 1, wherein:
the distinguishing during the one iteration comprises selecting the first subset of components by selecting components of the first set of components which are called with a frequency above an associated threshold during the running of the application with the first set of components.

8. The computer-implemented method of claim 1, wherein:
the distinguishing during the one iteration comprises selecting the first subset of components by selecting components of the first set of components which are called by a number of other components which exceeds an associated threshold during the running of the application with the first set of components.

9. The computer-implemented method of claim 1, wherein:
the distinguishing during the one iteration comprises selecting the first subset of components by selecting components of the first set of components for which a number of multiple instances which exceeds a threshold are in use simultaneously during the running of the application with the first set of components.

10. The computer-implemented method of claim 1, wherein:
the distinguishing during the one iteration comprises selecting the first subset of components by selecting components of the first set of components which at least one of: provide an entry point into another component, make method calls to other components or have a length which exceeds a length threshold.

11. The computer-implemented method of claim 1, wherein:
the distinguishing during the one iteration comprises selecting the first subset of components by selecting components of the first set of components which have a variance in execution time which exceeds a threshold during the running of the application with the first set of components.

12. The computer-implemented method of claim 1, wherein:
the distinguishing during the one iteration comprises selecting the first subset of components by determining which of the components of the first set of components is first invoked when processing a request during the running of the application with the first set of components, the first subset of components including the component of the first set of components which is first invoked.

13. The computer-implemented method of claim 1, wherein:
the distinguishing during the one iteration comprises selecting the first subset of components by determining which of the components of the first set of components is last invoked when processing a request during the running of the application with the first set of components, the first subset of components including the component of the first set of components which is last invoked.

14. The computer-implemented method of claim 1, wherein:
the distinguishing during the one iteration comprises selecting the first subset of components by determining which of the components of the first set of components call an application programming interface during the running of the application with the first set of components, the first subset of components including the components of the first set of components which call an application programming interface.

15. At least one processor readable memory having processor readable code embodied thereon, at least one processor is programmed by the processor readable code and performs a method comprising:
performing a static analysis of components of an application, the performing the static analysis comprises determining which of the components are worthy of instrumenting, the determining which of the components are worthy of instrumenting comprises determining which of the components are of at least one specific type which is of interest;
instrumenting the components which are determined to be worthy of instrumenting based on the static analysis to provide a first set of components, each component of the first set of components is instrumented with a probe which is initially made active so that the probe will be tripped and send component data to an agent when the component of the first set of components is invoked;
running the application with the first set of components with the probes which are made active;
monitoring the first set of components during the running based on the probes which are made active; and
based on the monitoring:
for each component of the first set of components: assigning a first score based on a first selection criterion, assigning a second score based on a second selection criterion, and providing a total score based on the first score and the second score,
based on the total scores, distinguishing a first subset of components of the first set of components for which active instrumentation is to be maintained in subsequent running of the application, from a second subset of components of the first set of components for which active instrumentation is not to be maintained in the subsequent running of the application,
keeping probes for the first subset of components active in the subsequent running of the application, and
making probes for the second subset of components inactive in the subsequent running of the application, where the probes for the second subset of components remain in the application and do not send component data to an agent, in the subsequent running of the application.

16. A system for selecting instrumentation points for an application, comprising:
a storage device; and
a processor in communication with the storage device, the processor:
carries out a performance of a static analysis of components of an application, the performance of the static analysis comprises a determination of a plurality of the components which are worthy of instrumenting;
divides the plurality of the components which are worthy of instrumenting into different sets of components comprising a first set of components and a second set of components;
in one iteration of an iterative process:
instruments each component of the first set of components with a probe which is made active so that the probe will be tripped and send component data to an agent when the component is invoked,
runs the application with the first set of components with the probes which are made active, while the second set of components does not have probes which are made active,
monitors the first set of components during the running based on the probes of the first set of components which are made active, and
based on the monitoring of the first set of components, for each component of the first set of components: assigns a first score based on a first selection criterion, assigns a second score based on a second selection criterion, and provides a total score based on the first score and the second score, and based on the total scores, distinguishes a first subset of components of the first set of components which meets a selection criterion from a second subset of components of the first set of components which does not meet the selection criterion;

in another iteration of the iterative process:
instruments each component of the second set of components with a probe which is made active so that the probe will be tripped and send component data to an agent when the component is invoked,
runs the application with the second set of components with the probes which are made active, while the first set of components does not have probes which are made active,
monitors the second set of components during the running based on the probes of the second set of components which are made active, and
based on the monitoring of the second set of components, distinguishes a first subset of components of the second set of components which meets the selection criterion from a second subset of components of the second set of components which does not meet the selection criterion; and
based on the one iteration and the another iteration, configures the application to subsequently run with probes which are active for the first subset of components of the first set of components and for the first subset of components of the second set of components, and to run without probes which are active for the second subset of components of the first set of components and for the second subset of components of the second set of components.

17. The computer-implemented method of claim 1, wherein:
the distinguishing during the one iteration comprises selecting the first subset of components by selecting components of the first set of components which call other components with a frequency above an associated threshold during the running.

18. The computer-implemented method of claim 1, wherein:
the distinguishing during the one iteration comprises selecting the first subset of components by selecting components of the first set of components which call a number of other components which exceeds an associated threshold during the running.

19. The computer-implemented method of claim 1, wherein:
the at least one specific type which is of interest comprises at least one of a servlet, a Java Server Page, an Enterprise Java Bean, a Java Database Connectivity component or a .NET component.

20. The computer-implemented method of claim 1, wherein:
the determining which of the components are worthy of instrumenting comprises parsing and analyzing code of the application to detect which of the components is associated with a specific name of a class of interest.

21. The computer-implemented method of claim 1, wherein:
the determining which of the components are worthy of instrumenting comprises parsing and analyzing code of the application to detect which of the components is associated with a specific name of a direct or indirect super class of interest.

22. The computer-implemented method of claim 1, wherein:
the determining which of the components are worthy of instrumenting comprises parsing and analyzing code of the application to detect which of the components is associated with a specific name of a directly- or indirectly-implemented interface of interest.

23. The computer-implemented method of claim 1, wherein:
the determining which of the components are worthy of instrumenting comprises parsing and analyzing code of the application to detect which of the components is associated with a specific name of a method of interest.

24. The computer-implemented method of claim 1, wherein:
the another selection criterion is more exclusive than the first selection criterion.

25. The computer-implemented method of claim 24, wherein:
the first selection criterion comprises one execution time; and
the another selection criterion comprises another execution time which is greater than the one execution time.

26. The computer-implemented method of claim 24, wherein:
the first selection criterion comprises one variance in execution time; and
the another selection criterion comprises another variance in execution time.

27. The computer-implemented method of claim 24, wherein:
the first selection criterion comprises one number of components called; and
the another selection criterion comprises another number of components called.

28. The at least one processor readable memory of claim 15, wherein:
the first score has a different weight than the second score based on a relative importance of the first selection criterion to the second selection criterion.

29. The system of claim 16, wherein:
in the one iteration, the second set of components is not instrumented with probes; and
in the another iteration, the probes of the first set of components, including probes of the first subset of components of the first set of components, are removed; and
to configure the application to subsequently run with probes which are active for the first subset of components of the first set of components, the processor adds the probes of the first subset of components of the first set of components back into the first subset of components of the first set of components.

30. The system of claim 16, wherein:
the processor divides the plurality of the components which are worthy of instrumenting into the different sets of components comprising the first set of components and the second set of components according to a first range of alphabetical names of the first set of components and a second range of alphabetical names of the second set of components.

31. A computer-implemented method for selecting instrumentation points for an application, comprising:
performing a static analysis of components of an application, the performing the static analysis comprises determining which of the components are worthy of instrumenting, the determining which of the components are worthy of instrumenting comprises determining which of the components are of at least one specific type which is of interest;
instrumenting the components which are determined to be worthy of instrumenting based on the static analysis to provide a first set of components, each component of the first set of components is instrumented with a probe which is initially made active so that the probe will be tripped and send component data to an agent when the component of the first set of components is invoked;
in one iteration of a filtering process:
running the application with the first set of components while monitoring the first set of components based on probes of the first set of components,
based on the monitoring of the first set of components, assessing the first set of components using one selection criterion, and
based on the assessing the first set of components using the one selection criterion, distinguishing a first subset of components of the first set of components for which active instrumentation is to be maintained from a second subset of components of the first set of components for which active instrumentation is not to be maintained; and
in another iteration of the filtering process:
running the application with the first subset of components while keeping probes for the first subset of components active and making probes for the second subset of components inactive, where the probes for the second subset of components remain in the application, and do not send component data to an agent, in the another iteration, and while monitoring the first subset of components based on the probes of the components of the first set of components,
based on the monitoring the first subset of components, for each component of the first subset of components: assigning a first score based on a first selection criterion, assigning a second score based on a second selection criterion, and providing a total score based on the first score and the second score; and
based on the total scores, distinguishing a subset of the first subset of components for which active instrumentation is to be maintained in subsequent running of the application from a subset of the first subset of components for which active instrumentation is not to be maintained in the subsequent running of the application.

* * * * *